(12) United States Patent
Wesson et al.

(10) Patent No.: US 6,540,068 B1
(45) Date of Patent: Apr. 1, 2003

(54) RIM ASSEMBLY FOR A ROLLER ASSEMBLY FOR USE WITH CARGO MOVER SYSTEMS

(75) Inventors: John P. Wesson, Vernon, CT (US); Renee H. Croteau, Raleigh, NC (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/710,216

(22) Filed: Nov. 10, 2000

(51) Int. Cl.7 .............................................. B65G 39/10
(52) U.S. Cl. ...................... 198/843; 193/35 R; 193/37; 474/191
(58) Field of Search ................. 198/843, 845; 193/35 F, 37, 35 R; 16/45; 492/56, 59; 474/178, 191; 152/5, 7, 246, 323; 301/5.3

(56) References Cited

U.S. PATENT DOCUMENTS

| | | | | |
|---|---|---|---|---|
| 1,743,100 A | * | 1/1930 | Blackburn | ................. 152/5 |
| 2,017,149 A | * | 10/1935 | Greening | ................. 474/191 |
| 2,326,670 A | * | 8/1943 | Patterson | ................. 474/191 |
| 5,137,135 A | | 8/1992 | Pietsch et al. | |
| 5,852,897 A | | 12/1998 | Sukale | |

* cited by examiner

*Primary Examiner*—James R. Bidwell
(74) *Attorney, Agent, or Firm*—Gene D. Fleischhauer (57) ABSTRACT

A rim assembly for a roller assembly and method of forming a rim assembly for cargo mover systems are disclosed. Various steps and construction details are developed for affecting the response of the rim assembly to operative conditions. In one detailed embodiment, the roller assembly has a rim assembly having a rolling surface whose operative surface characteristics are set by the material of the surface material; and structure is disposed inwardly of the rolling surface which affects the bulk behavior of the roller assembly. In one particular embodiment, the roller assembly is adapted for use with moving doors or wall panels in elevator systems.

27 Claims, 3 Drawing Sheets

RIM ASSEMBLY FOR A ROLLER ASSEMBLY FOR USE WITH CARGO MOVER SYSTEMS

TECHNICAL FIELD

This invention relates to a roller assembly which passes through predetermined points in its travel for use in the field of cargo mover systems, such as in elevators, escalators, and moving walkway systems. More particularly, this invention relates to a rim assembly for the roller assembly of such a system. This invention was developed for lightweight roller assemblies used with elevator doors as the doors are moved between the open and closed positions and has application to other roller assemblies following a defined path used for cargo mover systems.

BACKGROUND OF THE INVENTION

Roller assemblies used in escalator systems and elevator systems typically pass through predetermined points that form a defined path. These systems are of the type that are typically self-propelled or driven externally. The systems that are driven externally may be driven by a cable, belt or chain of both the open or endless type, or by a mechanical mechanism utilizing screw drives or lever arm actuation. In these systems, the roller assembly and the rail on which the roller assembly moves are a defined portion of the system. For example, the shape and the surface characteristics of the rail surface are defined. Since the rail surface is well-defined, expectations for life, low noise and other characteristics are greater than expectations for roller assemblies used on undefined surfaces, such as might be experienced by bicycles, automobiles and moving carts.

Roller assemblies used in escalators and elevators typically have a rim assembly which includes a rim and a ring in solid form that is positioned from the rim. The ring in solid form has requirements for operative characteristics that are very different from the operative requirements for a ring which is in part supported by gas under pressure, such as automobile tires and the like. In particular, roller assemblies used for elevator doors especially have significant requirements for operative characteristics that can be in conflict. Such roller assemblies may be driven or nondriven.

In contrast, roller assemblies used for guiding elevators or used for escalator systems do not have as many demanding operative characteristics even though the roller assembly follows a defined path. Escalator systems typically use nondriven roller assemblies. For example, the nondriven roller assembly may be attached to an operating element for guiding the element, such as a step chain in the escalator system. One example is shown in U.S. Pat. No. 5,137,135 entitled "Escalator Step-Chain Roller" issued to Pietsch et alia. The roller assembly includes a rim assembly having a rim. The rim has a groove bounded by a surface which faces outwardly. A flexible outer ring in solid form is disposed in the groove and is spaced axially from the sides of the groove. The ring has a rolling surface for rolling contact with a second element. In Pietsch, the cooperating second element is an escalator track.

Elevator systems employ both nondriven roller assemblies and driven roller assemblies that have a ring in solid form. Nondriven roller assemblies may be used for guiding movement of an elevator car as the car moves vertically between predetermined locations. These guide roller assemblies are similar to the roller assembly shown in Pietsch and have somewhat similar operating requirements. The guide roller assemblies are distinguished by the need for the roller assembly to rotate at relatively high speeds in comparison to the escalator roller assembly to accommodate the speed of the elevator car.

As discussed earlier, elevator systems also employ door roller assemblies for guiding elevator doors on the car as the doors are opened and closed. The roller assemblies rotate at a lower rotational speed than do guide rollers for guiding the elevator car. The door roller assemblies are lightweight and may be non-driven, rolling as the door is moved; or may be driven, rotating to drive the door.

A nondriven roller assembly may be attached to the door and may roll on a track as the door is moved by another device between the open and closed positions. A driven roller assembly engages the track and might be attached to the door. These driven roller assemblies, or traction roller assemblies, are driven about an axis of rotation to move the door between the open and closed positions. An example of such a motorized roller assembly is shown in U.S. Pat. No. 5,852,897 entitled "Door Drive" issued to Sukale.

Figure 1:
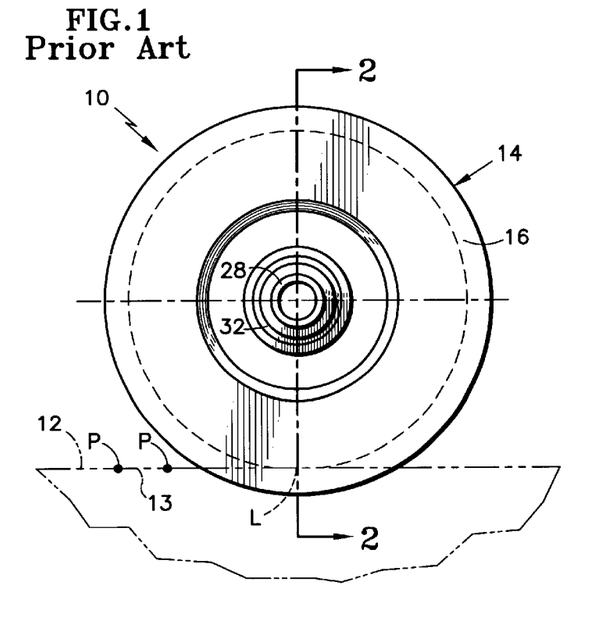
FIG. 1 is a simplified side elevation view of a prior art lightweight roller assembly for a door assembly of an elevator and a rail or track upon which the roller assembly moves.
Figure 2:
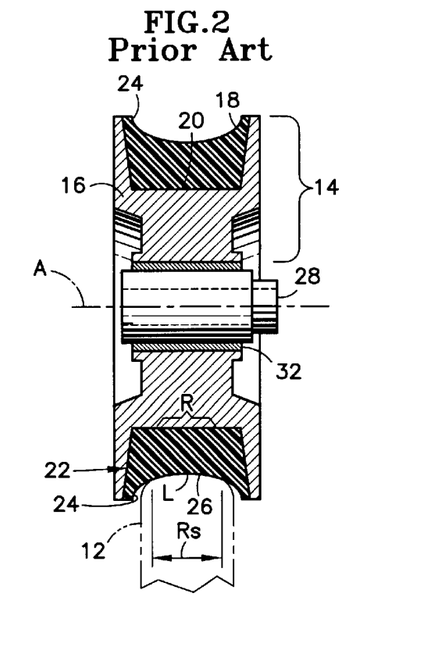
FIG. 2 is a cross-sectional view of the roller assembly and rail shown in FIG. 1 taken along the line 2—2 of FIG. 1.

FIG. 1 is a simplified side elevation view of a roller assembly, such as a lightweight roller assembly 10 for elevator doors, and of a rail 12 on which the roller assembly moves. The rail has a plurality of predetermined location points P which form a defined path 13 for the roller assembly The roller assembly has an axis of rotation A. FIG. 2 is a cross-sectional view taken through the simplified roller assembly and the rail along the lines 2—2 of FIG. 1. The cross-sectioning plane contains the axis A and passes through the circumferential location L. The circumferential location L is the location at which the maximum force is transmitted from the rail to the roller assembly as the rail reacts to the load imposed by the roller assembly on the rail.

As shown in FIG. 1 and in FIG. 2, the roller assembly 10 has a rim assembly 14. The rim assembly is usable with both a driven and a nondriven roller assembly. The rim assembly has a freestanding rim 16 and a groove 18 bounded by a radially outwardly facing surface 20. A flexible ring 22 in solid form is disposed in the groove. The ring extends circumferentially and axially about the rim.

The ring 22 has an outwardly facing surface 24. The outwardly facing surface includes the rolling first surface 26 which adapts the roller assembly to engage the rail. The rolling first surface has an axial width Rs. The rolling first surface under a particular operative condition of the roller assembly is limited to that portion of the outwardly facing surface, which contacts the rail.

A first element, as represented for example by a shaft 28, is attached to one of the doors. The shaft is disposed about an axis of rotation A. In alternate embodiments the shaft might be part of the roller assembly and attached to another portion of the first element. The rail 12 is a second element and is engaged by the roller assembly 10. The roller assembly includes a bearing, as represented for example by a sleeve bearing 32 or a roller bearing as shown in Pietsch. The bearing is disposed between the shaft and the rim assembly to enable movement of the rolling first surface 26 of the ring on the rail.

The rim 16 positions and supports the rolling surface of the flexible ring 22 under operative conditions through a support region R against loads acting on the rolling surface. The ring 22 forms the support region R for the rolling surface in the operative condition. The support region extends radially from the rolling surface to the rim and across the width Rs of the rolling surface. In the embodiment shown, the lightweight roller assembly is not absolutely constrained against movement except for the engagement between the ring and the rail. In one sense, it is a self-guiding roller assembly.

The above art notwithstanding, scientists and engineers are working under the direction of applicants assignee to develop new materials or to develop alternative designs and methods for forming a rim assembly having a flexible ring in solid form which would enhance one or more operative characteristics of the rim assembly under different operative conditions.

SUMMARY OF INVENTION

This invention is in part predicated on the realization that cargo mover systems use different kinds of roller assemblies for following a defined path with a flexible ring in solid form. The roller assemblies have operative characteristics which may markedly differ depending on the application chosen for the roller assembly or, in a particular application, may change as operative conditions of the cargo mover system change.

A flexible ring is considered to be in solid form where the material of the flexible ring does not rapidly assume the shape of a container in which it is disposed as does a gas or a low viscosity liquid; and, where the average radial height A of the ring is at least sixty (60) percent of the radial distance from the rolling surface of the ring to the support rim. The term "ring" means annular constructions of flexible material of one or more annular parts that have surfaces in faying contact over at least a portion of the circumference of the ring. The ring provides a radial load path from the rolling surface to the rim and may have continuous circumferential elements or one or more circumferential elements having relatively small circumferential gaps which present the appearance of a ring shape, such as might be used if there is a need for "noise" under operative conditions.

Typically, the flexible ring is circumferentially continuous. One example of such a roller assembly is a lightweight roller assembly used with elevator doors. The roller assembly may require a ring having acceptable load bearing and rolling characteristics that are supplemented with a need for a noise-damping characteristic (vibrational energy damping characteristic). In a driven roller assembly system, the friction or traction characteristic is more important because slipping between the ring and the rail directly effects operation of the doors.

Many flexible materials provide a mix of these operative characteristics. This frequently requires using flexible materials having many operative characteristics that are desirable when used with elevator door systems but also requires accepting some operative characteristics that are less than ideal.

For example, a material providing an acceptable service life and rolling characteristic might have a less than ideal friction characteristic and damping characteristic. This may cause elevator passengers to notice slow door speed or elevator door noise by having these annoyances intrude into their consciousness. On the other hand, providing an adequate damping characteristic might require using a material having a poor rolling characteristic, causing a flat spot to form on the rolling surface which results in noisy operation. Still another compromise might result in using a material having better friction characteristics but which is less durable. Then, noise might result from wear on the surface of the ring. The significance of these concerns increases for door roller assemblies because of the close proximity of the roller assembly to passengers as the doors open and close.

This invention is also in part predicated on the recognition that improved operative characteristics may result from using a roller assembly having special features for any of the preceding applications, and particularly for a door roller assembly. The special features include having a ring in solid form backed with a radial cavity, having a ring in solid form that has more than one part or more than one material, or having a ring in solid form which provides a combination of these features. This permits selecting a material for the surface based on operative characteristics related to surface behavior. These include, for example, cut characteristics, tear characteristics, wear resistance characteristics, resistance to fluid exposure characteristics and friction or traction characteristics. The special features permit modifying operative characteristics of the rim assembly relating to bulk behavior from the bulk behavior characteristics expected from use of the material selected for the rolling surface. Characteristics relating to bulk behavior include rolling resistance characteristics, deformation under load characteristics, damping characteristics and hysterisis heating characteristics. As a result, the bulk behavior of the rim assembly could differ from that which might normally be expected when using the material of the surface as taught by prior art constructions.

According to the present invention, a method for forming a rim assembly for a roller assembly includes disposing a ring in solid form about the rim, forming the rolling surface with a first layer of first material selected for an operative characteristic related to surface behavior; and, providing structure inwardly of at least a portion of the rolling surface which changes an operative characteristic relating to bulk behavior from the operative characteristic that an identical rim assembly would have when entirely filled with the first material in the radial direction.

According to the present invention, the flexible ring is in solid form, has at least a first layer of material which forms the rolling surface to effect the interaction of the flexible ring with the environment; and has a support region for the rolling surface which is defined by the location of the ring radially inward of the rolling surface under operative conditions; and, in the uninstalled condition, the layer of first material is located such that the layer does not entirely fill the space of the support region that exists over the axial width of the rolling surface under operative conditions either because the outer layer of first material deforms under operative loads into a cavity which exists radially below the outer layer in the uninstalled condition or because the support region includes both the material of the first layer and another, different material.

In accordance with one detailed embodiment of the present invention, a rim assembly for a door roller assembly has a first material selected for the rolling surface of the rim assembly and has a stiffness characteristic which is less than about ninety (90) percent of the stiffness characteristic of a rim assembly having a ring having the same contour for the rolling surface with the ring and any portion of a cavity radially between the ring and the rim filled entirely with the first material.

In accordance with one detailed embodiment of the present invention, the ring is formed of a first layer of material having the rolling surface and at least one layer of a different material disposed radially inwardly of the first layer of material.

In accordance with another detailed embodiment of the present invention, the first layer of material has discrete cavities disposed within the layer and filled with a different flexible material.

A primary feature of the present invention is a roller assembly having a rim assembly. The rim assembly has a rim and a flexible ring in solid form. The flexible ring has a rolling surface. A primary feature of one embodiment of the present invention is a rim assembly having an operative characteristic relating to rolling behavior at the rolling surface established in part by the material of the rolling surface and a bulk behavior characteristic for the rim assembly which differs from the expected bulk behavior characteristic of a rim assembly having no cavities and having a flexible ring in solid form which is formed entirely of the material used for the rolling surface. In one detailed embodiment, the rolling surface is concave. In one embodiment, the flexible ring has a first layer of a first material. A feature is a groove which adapts the rim assembly to receive the ring. In one detailed embodiment, the first material is disposed in the groove and spaced radially from the rim. In another detailed embodiment, a second layer of material is disposed radially inwardly of the first layer of material.

A principal advantage of the present invention is the performance of a roller assembly which results from establishing the rolling characteristic of the rim assembly (and thus the roller assembly) with a first material and modifying the bulk behavior characteristic of a roller assembly from that which is expected from using the first material throughout the rim assembly. Another advantage is the rolling characteristic which results from being able to tailor the response of the rolling surface to exterior loads by varying in the axial direction the radial stiffness of the flexible ring which forms the rolling surface. Still another advantage of the present invention is the design and manufacturing flexibility for forming a roller assembly which results from combining, for example, a single material or at least two different materials and a cavity for forming the rim assembly. Another advantage is the ability to tailor the response of the rim assembly to different applications or to retrofit changes to an existing application without changing the external contour of the rim assembly. In one embodiment, a principal advantage is the noise for a given amount of traction which results from using a relatively soft material for the inner layer as compared to the outer rolling layer or which results from disposing a cavity beneath an outer layer to decrease the effective stiffness of the structure.

The foregoing and other features and advantages of the present invention will become more apparent in light of the following detailed description of preferred embodiments thereof as discussed and as illustrated in the accompanying drawings.

DETAILED DESCRIPTION

Figure 3:
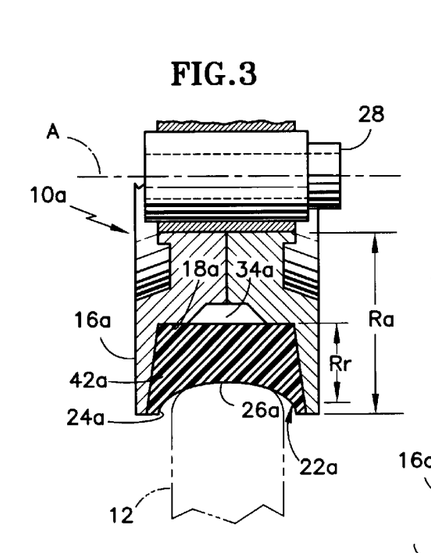
FIG. 3 is a cross-sectional view of an alternate embodiment of the roller assembly shown in FIG. 2 in the uninstalled condition showing one embodiment of the present invention.

FIG. 3 is a cross-sectional view showing one embodiment of a roller assembly 10a of the present invention in the uninstalled condition. The rail 12 is in phantom. FIG. 3 shows the relationship of the rail to the undeformed concave rolling surface 26a which is part of the outwardly facing surface 24a of the ring 22a. The ring is in solid form. The ring is disposed in the groove 18a of the rim 16a. The ring is constructed of a preformed insert made of a layer of first material 42a. In one embodiment, the first material is a fluoroelastomer material having a first radial stiffness characteristic under operative conditions.

The ring 22a engages the outwardly facing surface 20a of the rim 16a. The rim surface 20a extends radially inwardly away from the ring. This spaces the ring radially from a portion of the rim surface 20a leaving an annular cavity 34a therebetween. In one particular embodiment, the ring has an average radial height Rr which is at least twenty (20) percent of the radial height Ra of the rim assembly and in the embodiment shown, about forty (40) percent.

Figure 4:
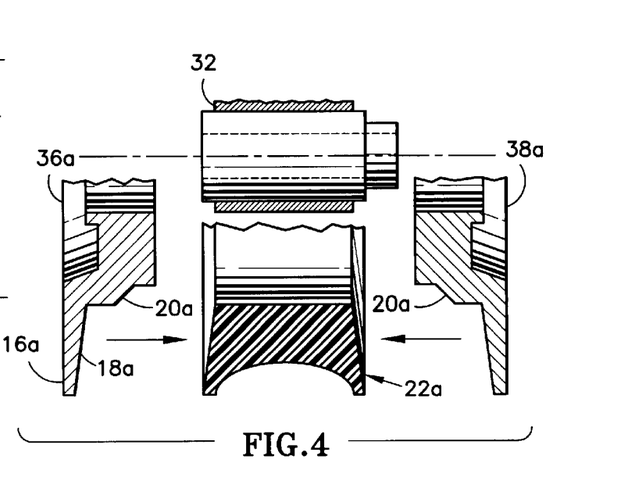
FIG. 4 is a schematic, cross-sectional, side elevation view of the roller assembly shown in FIG. 3 in exploded form illustrating the method of assembling the roller assembly.

FIG. 4 is a schematic, cross-sectional, side elevation view of the roller assembly 10a shown in FIG. 3. The roller assembly is shown in exploded fashion, illustrating one method of assembling a roller assembly. This method forms the rim into a first half 36a and a second half 38a which are joined by bonding, bolting or the like. This enables using a preformed insert for the ring.

The rim 16a is formed of a material, such as steel, having a second radial stiffness characteristic under operative conditions. The second radial stiffness characteristic of the material of the rim is greater than the first radial stiffness characteristic of the ring. Each half 36a, 38a of the rim has a portion of the radially facing surface 20a which bounds the groove. A surface is a radially facing surface if the surface is viewable from a direction perpendicular to the axis of the roller assembly. In the embodiment shown, a radially outwardly facing surface is shown which is viewed radially inwardly. The ring may be circumferentially discontinuous, circumferentially continuous, preformed or molded in place.

Figure 5:
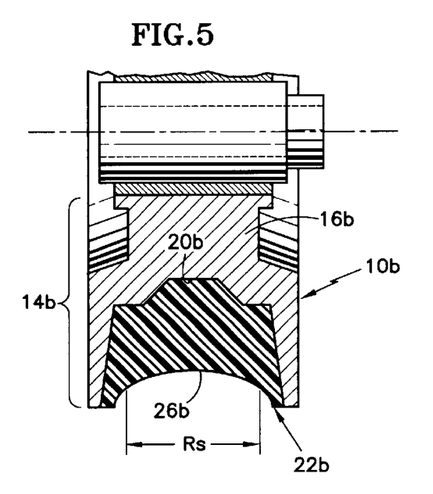
FIG. 5 is a schematic cross-sectional view of an alternate embodiment of the roller assembly shown in FIG. 3 at the location L, the embodiment being a reference roller assembly for comparison with the embodiment shown in FIG. 3.

FIG. 5 is a schematic cross-sectional view at the location L of a reference roller assembly 10b for comparison with the roller assembly 10a shown in FIG. 3. The first material fills the entire radial volume between the rolling surface 26b and the surface 20b of the rim 16b. This filled volume includes the space corresponding to the open cavity 34a. Accordingly, the first material of the ring 22b has no volume to deform into in the radial direction and the compressibility of the material becomes a significant factor. This increases the stiffness of the ring as compared to the FIG. 3 construction which does have a cavity.

Figure 6:
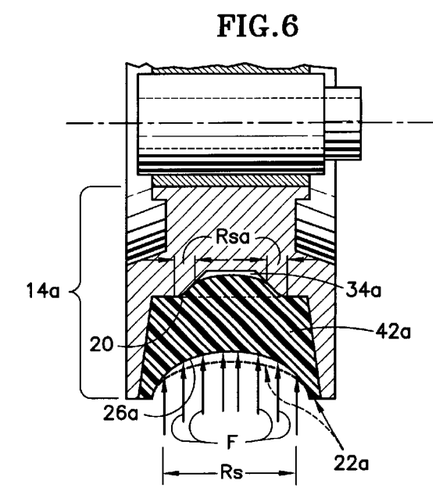
FIG. 6 is a schematic cross-sectional view of the roller assembly shown in FIG. 3 at the location L showing in full the installed or operative position of the ring and its local deformation and showing with dotted lines the uninstalled position of the ring.

FIG. 6 is a schematic cross-sectional view of the roller assembly 10a shown in FIG. 3 at the location L. FIG. 6 shows in full the installed or operative contour of the ring 22a with the rail 12 broken away for clarity and represented by lines of force F. The ring is locally deformed by contact with the rail. The ring has a support region Rs formed by part of the ring for the rolling surface 26a at each operative condition of the roller assembly including the at rest operative condition. Accordingly, this part of the ring in the operative condition is radially inwardly of the rolling surface with radial boundaries aligned with the span lines associated with the dimension line for the region Rs. This part of the ring entirely occupies the support region for the rolling surface. The space occupied by that part of the ring (i.e. the support region) at a particular operative condition, provides a reference space that corresponds to the support region for that condition.

As shown in FIG. 6, the ring 22a of FIG. 3 under at least one operative condition extends into faying contact with the second surface 20 of the rim over at least a portion of the axial width of the rim. Accordingly, the support region extends radially from the rolling (first) surface toward and to the second surface 20 or face of the rim over at least a portion of the axial width of the rim. The contact is represented by the faying contact in FIG. 6 of the ring with the two portions Rsa of the axial length of the rim such that it engages the rim on either side of the annular cavity 34a. The support region also extends into the cavity 34a and includes that portion of the cavity which is occupied by the ring but, as shown, does pot include that portion of cavity 34a into which the ring does not extend.

FIG. 6 also shows with dotted lines the contour of the ring 22a in the uninstalled condition of the roller assembly 10a of FIG. 3. In the uninstalled condition, the first material comprises a first layer of material 42a forming the ring. The layer of material in the uninstalled condition is not deflected into a portion of the cavity 34a. Accordingly, the layer of first material fills a larger portion of the reference space corresponding to the support region under operative conditions than does that layer in the uninstalled condition. In other embodiments, the ring may have more than one layer of material.

This provides an advantage in forming a roller assembly 10 by permitting use of a material having at least one operative characteristic selected for use with the roller assembly which is different from the operative characteristic that the reference roller assembly 10b would have with the same material. For example, an elevator door does not move as the elevator car moves between floors. As a result, the roller assembly develops a flat spot on the rolling surface at the location L. The cavity 34a behind the ring 22a allows the ring to bend into the cavity and to deform radially into the cavity. This reduces the effective radial stiffness of the rim assembly 10a by reducing the effect that the compressibility of the material has on the stiffness of the rim assembly (by reason of the ability of material to deform into the cavity). This increases the effect that the elastic modulus of the material has on the stiffness of the system. The roller assembly recovers more quickly from a flat spot than a stiffer structure and the material radially re-forms into a symmetrical shape as it rolls along the track. Therefore, quieter operation results than would result from the roller assembly 10b having the entire radial volume between the rolling surface 26b and the surface 20b of the rim filled with the first material.

In one embodiment, the rim assembly 14a has a stiffness characteristic which is less than about ninety (90) percent of the stiffness characteristic of the rim assembly 14b of the reference roller assembly shown in FIG. 5. As discussed earlier, the FIG. 5 embodiment has a ring having the same contour for the rolling surface with the ring and any portion of a cavity radially between the rolling surface 26b of the ring and the rim 16b filled entirely with the first material.

Another advantage that results from deforming or bending the ring 22a inwardly is the tracking characteristic of the rim assembly 14a on the rail 12 as compared to the FIG. 5 reference roller assembly 10b. The rail exerts a restoring axial force on the ring 22a which increases as the roller assembly moves axially away from an axially centered position on the rail. The restoring force results from the axial component of force which grows larger with deflection of the ring because the surface of the ring assumes a more radially directed slope as the ring deflects more in the less radially stiff region (thinner region) at the axial central portion of the ring. Thus, as the roller assembly tends to move away from an axially centered location on the rail, the rail exerts a larger component of restoring force in the axial direction because of the deflection of the ring.

Figure 7A:
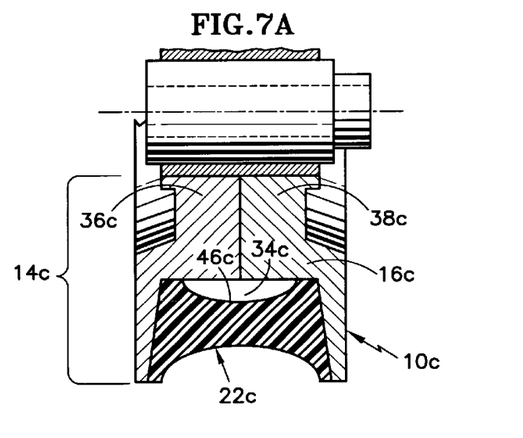
FIGS. 7A–7F are alternate embodiments of the roller assembly shown in FIG. 3 and of each other with each having a cavity disposed between the ring and the rim.

FIG. 7A is an alternate embodiment 10c of the roller assembly 10a shown in FIG. 3. The roller assembly 10c is shown in the uninstalled condition. The roller assembly has an annular cavity 34c. The annular cavity is formed in part by the inner surface 46c of the ring which extends radially outwardly away from the rim 16c to form an annular concavity in the ring 22c. The ring may be made of a preformed insert because the rim assembly 14c has a rim 16c formed in two halves 36c, 38c. In this embodiment, the decreased thickness of the ring in the axial center of the ring permits the roller assembly to better track the rail by centering the flexible ring on the rail in the axial direction.

Figure 7B:
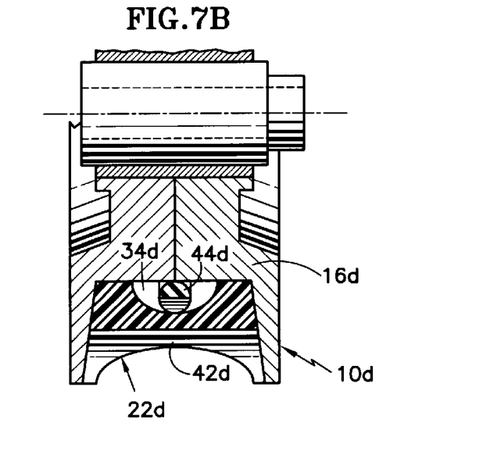

FIG. 7B is an alternate embodiment 10d of the roller assembly 10a shown in FIG. 7A. The roller assembly 10d is shown in the uninstalled condition. The roller assembly has a rim assembly having a rim 22d formed of two parts or layers as represented by the preformed layers 42d, 44d. The layers are shown partially in cross-section and partially in full by the shading lines. The layers are interrupted circumferentially by a small gap at the location where the layers are shown in full. The first layer 42d has an annular cavity 34d formed by a concavity in the first layer. The second layer 44d is an elliptical core which is disposed in the annular cavity. The second layer has a first portion which is spaced from the first layer and a second portion which is in faying contact with the first layer. The second part or layer deforms under load in both the radial and axial directions. The first part or layer deforms in the radial direction over at least a portion of the axial width of the rim assembly. This permits both parts to bend radially and to deform axially and radially, reducing the effect that compressibility has on stiffness. Stiffness becomes more a function of the modulus of elasticity of both materials, with the inner material of the second part 44d having a smaller modulus of elasticity than the outer material of the first part 42d. This decreased stiffness or increased softness speeds recovery of the rim assembly from a flat spot. In an alternate embodiment, the first layer of the ring might be spaced from the second part over the entire extent of the ring in the uninstalled condition and in faying contact under operative conditions. The first and second layers might have a circumferential gap which extends entirely through the first layer and the second layer.

Figure 7C:
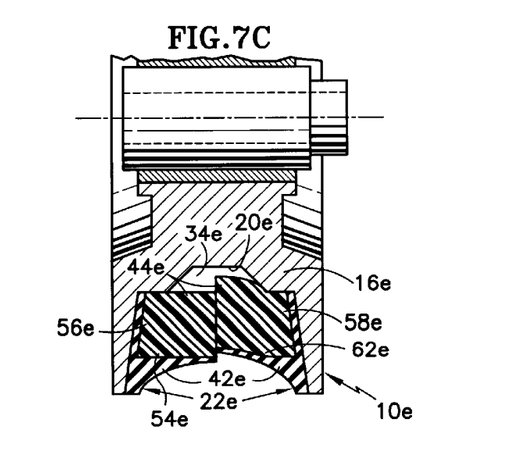

FIG. 7C is a split cross-sectional view of an alternate embodiment 10e of the roller assemblies 10a, 10d shown in FIG. 3 and FIG. 7B; and, shows the uninstalled position of the ring 22e on the left one-half of FIG. 7C and the installed position of the ring on the right half FIG. 7C. The ring is spaced radially from the axially central portion of the surface 20e of the rim 16e leaving a cavity 34e therebetween. As with the FIG. 7A roller assembly 10c, the cavity allows the ring 22e to deflect more than if the cavity were filled.

The ring 22e has a second layer 44e of flexible material or flexible foam material disposed inwardly of the first layer 42e of material. The second layer of material may be an insert and is in faying contact with the first layer of flexible material. The second layer of material has an outhardly oriented surface 54e having a first axially facing side 56e, a second axially facing side 58e. The second layer has a third face 62e which faces radially outwardly and which extends between the first axially facing side and the second axially facing side. The first layer 42e of material may be molded over the second layer 44e of material such that it partially encapsulates the second layer of material on the axially facing surfaces 56e, 58e or sides and on the third, outermost surface 62e of the second layer. The first layer of material protects the second layer of material from contact with harmful contaminants, such as corrosive liquids or grease.

Figure 7D:
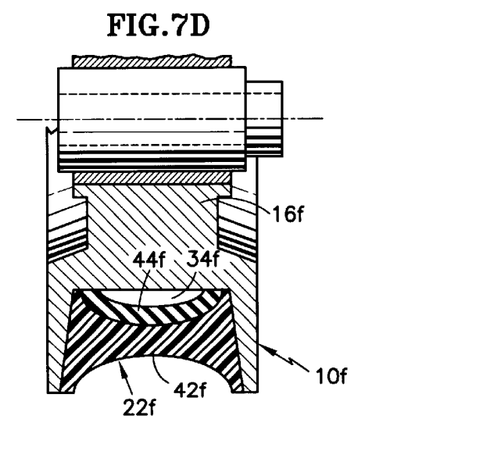

FIG. 7D is an alternate embodiment 10f of the roller assemblies 10c, 10e shown in FIG. 7A and FIG. 7C. The roller assembly 10f has a ring 22f which includes a concave-concave first layer 42f of flexible material and a convex-concave second layer 44f of a second flexible material. The convex portion of the second layer nests with the concave portion of the first layer. The second layer extends axially across the concave portion of the first layer. The concave portion of the second layer is spaced radially from the rim 16f leaving an annular cavity 34f therebetween. The second layer of material might be a flexible foam or flexible material with properties which differ from the properties of the first layer. For example, the second material might have a smaller radial stiffness characteristic than the first; and, the second layer in combination with the cavity 34f might then allow a greater deflection of the ring under operative conditions than does the embodiment shown in FIG. 7A.

Figure 7E:
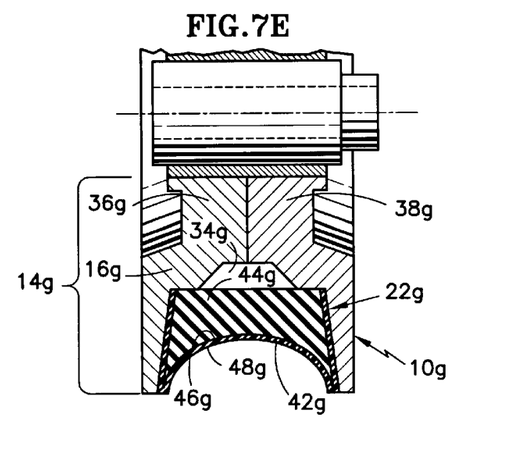
Figure 7F:
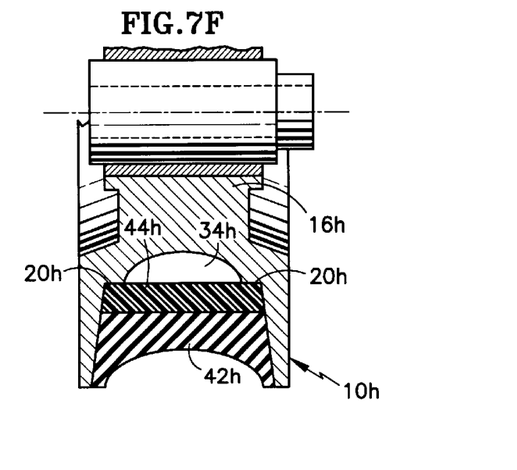

FIG. 7E is an alternate embodiment 10g of the roller assembly shown in FIG. 7C. The rim assembly 14g has a ring 22g having a relatively thin first layer 42g of flexible material that forms a flexible skin for the ring. The skin has a substantially constant cross-sectional thickness as measured along a line perpendicular to the inner surface 46g and to the outer surface 48g of the first layer. The first layer extends into a faying relationship with the second layer 44g to encapsulate the thicker second layer on two sides and the face. The second layer forms a flexible core and is spaced radially from the rim 16g leaving an open cavity 34g therebetween. The core is made from a dissimilar material or foam. A preformed flexible ring 22g might be used because the rim assembly is formed in two halves 36g, 38g. For example, the ring might have a flexible skin molded over a preformed core. Alternatively, another way of forming the ring is molding the skin over an existing core on the rim assembly or making the ring using a two shot or coinjection molding process FIG. 7F is an alternate embodiment 10h of the roller assembly 10e shown in FIG. 7C. The flexible second layer 44h extends across substantially the entire axial width of the surface 20h of the rim 16h. The surface 20h has a concavity that spaces the rim from the second layer 44h leaving the cavity 34h therebetween. The flexible second layer 44h extends into a faying relationship with the first layer 42h; and, into a faying relationship with the rim surface 20h on either side of the concavity in the rim.

Figure 8A:
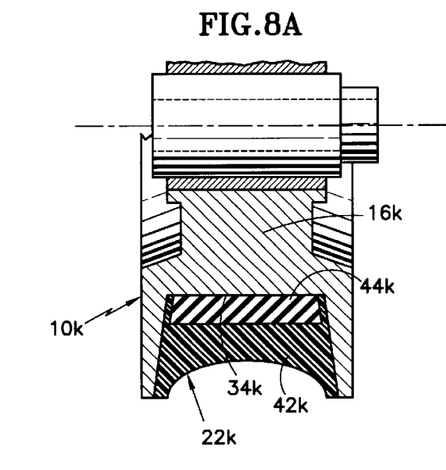
FIGS. 8A–8C are alternate embodiments of the roller assembly shown in FIG. 3 having a second material disposed inwardly of the rolling surface either as a second layer (FIG. 8A, FIG. 8B) or disposed as discrete portions in the first layer (FIG. 8C).

FIG. 8A is an alternate embodiment 10k of the roller assembly 10e shown in FIG. 7C. The ring 22k includes a first layer 42k of flexible material. The first layer of material is disposed outwardly of a second layer 44k of material. The second layer is bounded by the first layer on three sides. The first layer of material is spaced from the rim leaving an opening 34k for the second layer therebetween. The second layer of material extends axially across the opening; and, extends into a faying relationship with the rim 16k and with the flexible first layer of material. The second layer may be a flexible material such as a foam material or other material which compresses as a result of operative forces acting on the first layer of the ring. The first layer may be molded over the second layer.

Figure 8B:
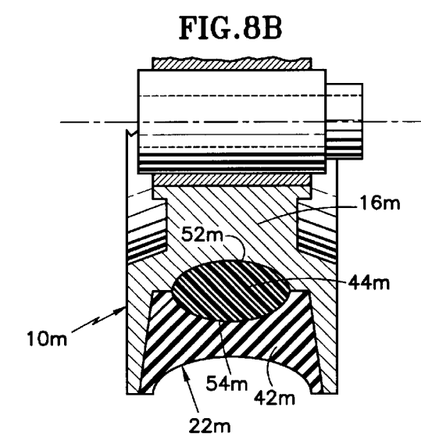

FIG. 8B is an alternate embodiment 10m of the roller assembly 10k shown in FIG. 8A having a ring 22m. The ring 22m includes an annular second layer 44m which has a convex outer surface 54m which faces outwardly and a convex inner surface 52m which faces inwardly. Each of the surfaces is in faying relationship with and is bounded by the adjacent surface, that is, by the rim 16m on the inwardly facing surface and by the first layer 42m of material on the outwardly facing surface. The second layer may be a flexible material such as a foam material or other material which compresses as a result of operative forces acting on the first layer of the ring.

Figure 8C:
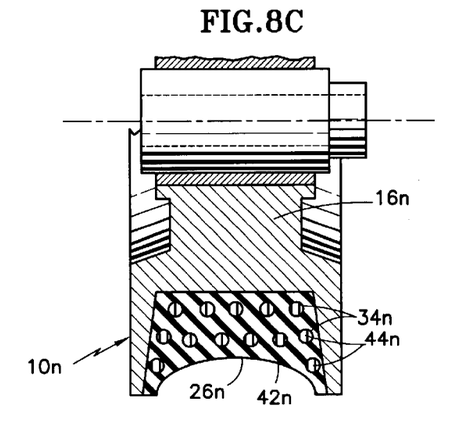

FIG. 8C is an alternate embodiment 10n of the roller assembly 10k shown in FIG. 8A having a first layer 42n of material disposed in the rim 16n. The first layer of material has a plurality of cavities 34n disposed radially inwardly of the rolling surface 26n on the first layer of material. Each cavity is entirely filled with a discrete portion of a second flexible material 44n. Under operative loads, the first layer of material is deflected inwardly, compressing the second material 44n. The second material may have a lesser or greater radial stiffness characteristic than the first material in this embodiment and in the other embodiments. The radial stiffness characteristic will affect the amount of compression of the second material which occurs for a given operative condition. The disposition of the discrete portions of material may also be tailored for the type of application in which the roller assembly is used.

In each of these embodiments, the new embodiments of the roller assembly 10 may have improved operative characteristics by using a multipart or multimaterial layer construction. For example, the performance of the outer skin or shell 42 may be tailored by using materials with characteristics matched to the requirements of the outer surface. In a particular system, changes in operating requirements with time may change and may be accomodated with the same external contour of the roller assembly by adjusting the operative characteristics of the rim assembly. These requirements include but are not limited to rolling surface characteristics such as cut, tear, wear, friction or traction, and resistance to fluid exposure characteristics. The overall bulk behavior of the new embodiment of the roller assembly may be tailored using core materials which match the bulk requirements. These bulk requirements include but are not limited to the rolling resistance, deformation under load, damping and hysterisis heating characteristics discussed earlier. Materials acceptable for the outer shell include, but are not limited to, polyurethane elastomers, polyester elastomers, Viton® material or other fluoroelastomers, and vulcanized synthetic rubbers. Examples of these materials and their availability are: castable polyurethane elastomer materials, such as Adiprene® material and Vibrathane® materials, available from Uniroyal Chemical Co., Inc., Southbury, Conn.; thermoplastic polyurethane elastomer materials, such as Pellethane® material, available from The Dow Chemical Co., Midland, Mich.; thermoplastic polyester elastomers, such as Hytrel® material, available from the E.I. du Pont de Nemours and Company, Newark, Del.: fluoroelastomer materials, such as Viton® material, available from Dupont Dow Elastomers LLC, Wilmington, Del. 19880 and Fluorel™ material available from Dyneon LLC, St. Paul, Minn.; and, synthetic rubber, available from Goodyear Chemicals, Goodyear Tire and Rubber Company, Akron, Ohio.

Materials for the core or second layer 44 include, but are not limited to, polyurethane elastomers, polyolefin elastomers, silicones, fluorosilicones, and synthetic or natural rubbers. Core materials also include foams of these materials and may include metal, plastic or rubber springs depending on the application. Examples of these materials are: castable polyurethane elastomer materials, such as Adiprene® material and Vibrathane® materials, available from Uniroyal Chemical Co., Inc., Southbury, Conn.; thermoplastic polyurethane elastomer materials, such as Pellethane® material, available from The Dow Chemical Co., Midland, Mich.; polyolefin elastomer materials, such as Santoprene® material, available from Advanced Elastomer Systems LP, Akron, Ohio; silicone materials, such as GE Silicone materials, available from GE Plastics, General Electric Company, Pittsfield, Mass. 01201; fluorosilicone materials, such as NuSil materials, available from NuSil Technology, Carpinteria, Calif. 93013; synthetic rubber available from Goodyear Chemicals, Akron, Ohio; and, natural rubber, available from General Latex, Boston, Mass.

Although the invention has been shown and described with respect to detailed embodiments thereof, it should be understood by those in the art that various changes in form and detail thereof may be made without departing from the spirit and scope of the claimed invention.

We claim:

1. For a roller assembly of an apparatus selected from an elevator, an escalator, or a movable track apparatus having a predetermined path for transporting cargo in alternating fashion between at least two fixed points, the apparatus including a first element having an axis of rotation for the roller assembly and a second element which is engaged by the roller assembly, the second element having a shape and surface characteristic that are defined for engaging the roller assembly, the roller assembly having an uninstalled condition, and having operative conditions in which the roller assembly is disposed about the axis of rotation in the installed condition, the roller assembly having a defined path of movement with respect to the second element under at least one operative condition which includes a plurality of predetermined location points, the roller assembly having a rim assembly having a first rolling surface facing outwardly which adapts the roller assembly to engage the second element along the defined path for permitting relative movement between the first and second elements along the defined path while transmitting forces between the elements, a rim assembly disposed about the axis of rotation which comprises:

a freestanding rim extending axially and circumferentially with respect to the axis of rotation about the rim assembly, the rim having a second surface on the rim assembly which faces outwardly and which extends circumferentially and axially and which adapts the rim to receive a ring of material, and;

the rim assembly in the uninstalled condition having structural features disposed between the first rolling surface and the rim which include a first layer of a first material and further include a structural feature selected from the group consisting of at least one cavity, at least one material different from the material of the first layer, and both at least one cavity and at least one material different from the material of the first layer, the rim assembly further including a ring in solid form in the uninstalled condition and under operative conditions of the rim assembly, the ring extending inwardly at least in part from the first rolling surface to the second surface of the rim, the ring extending circumferentially and axially about the rim and having an outwardly facing surface which includes the rolling first surface for engaging the second element, the ring in solid form including at least the first layer containing the first material, the first layer having at least a sufficient radial depth to form at least part of the outwardly facing rolling surface and provide the surface with a durability characteristic, the first material having a first radial sfiffness characteristic, the ring in solid form having a support region for the first rolling surface associated with each operative condition of the roller assembly which is defined by the position of the ring, the support region having boundaries extending radially through the ring with respect to the axis of rotation from the first rolling surface toward the second surface of the rim, the support region including only that portion of any cavities in the rim assembly into which the part of the ring inwardly of the first rolling surface radially deforms under a particular operative condition and not the remainder of any such cavity;

wherein the rim is formed of a material having a second radial stiffness characteristic under operative conditions which is greater than the first radial stiffness characteristic of the material of the ring;

wherein the first material of the first layer of the ring necessarily fills a larger portion of said support region under operative conditions than does said material in the uninstalled condition of the roller assembly which causes at least one operative characteristic selected from the group consisting of operative characteristics relating to the bulk behavior of the rim assembly and operative characteristics related to the surface behavior of the rim assembly to differ from a reference operative characteristic that corresponds to said at least one operative characteristic and that is for a rim assembly that is the same as said rim assembly except for having said support region and any cavities into which the ring deforms entirely filled with said first material.

2. The rim assembly of claim 1 wherein the rim assembly has operative characteristics relating to the bulk behavior of the rim assembly which include a rolling resistance characteristic, a deformation under load characteristic, a damping characteristic, and a hysterisis heating characteristic and wherein said reference operative characteristic is related to the bulk behavior of the rim assembly.

3. The rim assembly of claim 1 wherein the ring having the first layer containing the first material further includes a second layer containing a second material which is disposed radially inwardly of the first layer such that the first layer of material in said operative condition fills a larger portion of said support region than does said first layer of material in said uninstalled condition.

4. The rim assembly of claim 1 wherein the ring is spaced from the rim in said uninstalled condition leaving a cavity therebetween and wherein the ring has a deformation under load characteristic which adapts the ring to deform into the cavity under operative conditions.

5. The rim assembly of claim 3 wherein the first material of the first layer and the second material of the second layer each have operative characteristics related to the surface behavior of the material which include a cut characteristic, a tear characteristic, a wear resistance characteristic, a fluid resistance characteristic, a friction characteristic and a traction characteristic and wherein the first material and the second material each have operative characteristics relating to the bulk behavior of the material which include a rolling resistance characteristic, a deformation under load characteristic, a damping characteristic, and a hysterisis heating characteristic; and, wherein the first materiel of the first layer has an operative characteristic which is related to surface behavior which differs from that of the second layer and which effects the surface behavior of the rim assembly; and wherein the second materiel of the second layer has an operative characteristic which is related to bulk behavior which differs from that of the first layer and which effects the bulk behavior of the rim assembly.

6. The rim assembly of claim 1 wherein the first layer has preformed inserts of a second material disposed in the first material.

7. The rim assembly of claim 5 wherein the first layer is a preformed insert.

8. The rim assembly of claim 5 wherein the first layer is a molded construction.

9. The rim assembly of claim 3 wherein the ring is spaced from the rim leaving a cavity therebetween, wherein the ring includes a second layer disposed about the cavity the layer extending circumferentially about the rim, engaging the rim and having an outer surface which engages the first layer under at least one operative condition.

10. The rim assembly of claim 9 wherein the second layer is a preformed insert and wherein the outer surface of the preformed insert under at least one operative condition is spaced in part from the first layer and in part from the rim.

11. The rim assembly of claim 1 wherein the ring is circumferentially continuous.

12. The rim assembly of claim 2 wherein the ring is circumferentially discontinuous over at least a portion of the ring.

13. The rim assembly of claim 2 wherein the first materiel of the first layer has operative characteristics related to the surface behavior of the first material which include a cut characteristic, a tear characteristic, a wear resistance characteristic, a fluid resistance characteristic, a friction characteristic and a traction characteristic and wherein the first rolling surface of the rim assembly has a second operative characteristic relating to the surface behavior of the rim assembly which is affected by the materiel of the first layer.

14. The rim assembly of claim 1 wherein the ring includes a second layer of second material which is disposed radially inwardly of the first layer of the first material and wherein the first material and the second material each have operative characteristics relating to the bulk behavior of the material which include a rolling resistance characteristic, a deformation under load characteristic, a damping characteristic, and a hysterisis heating characteristic and wherein the first layer has a different operative characteristic relating to bulk behavior than does the second layer and wherein the operative characteristic relates to bulk behavior and differs from the reference operative characteristic.

15. The rim assembly of claim 14 wherein the second layer of material has an outwardly oriented surface having a first axially facing side, a second axially facing side and a third radially facing face which faces radially outwardly and which extends between the first axially facing side and the second axially facing side and wherein the first layer of material extends over the sides and the face to block fluid contaminants from contacting the second layer.

16. The rim assembly of claim 14 wherein a reference plane containing the axis of rotation intersects the second layer to form a generally rectangular cross-sectional shape.

17. The rim assembly of claim 14 wherein a reference plane containing the axis of rotation intersects the second layer to form a generally elliptical cross-sectional shape.

18. The rim assembly of claim 14 wherein the second layer of material is spaced from the rim leaving a cavity extending circumferentially therebetween.

19. The rim assembly of claim 18 wherein the second layer of material has an inwardly facing surface and wherein the inwardly facing surface extends radially outwardly away from the rim as the surface extends in the axial direction to form the cavity between the rim and the second layer of material.

20. The rim assembly of claim 18 wherein the second surface on the rim extends radially inwardly over a portion of the axial extent of the rim away from the second layer of material as the second surface on the rim as the surface extends in the axial direction to form the cavity between the rim and the second layer of material.

21. The rim assembly of claim 1 wherein the operative characteristic is the stiffness characteristic and wherein the stiffness characteristic of the rim assembly is less than about ninety (90) percent of the reference stiffness characteristic.

22. The rim assembly of claim 3 wherein the ring is not spaced from the rim in said uninstalled condition.

23. A method for forming a rim assembly for a roller assembly having an axis of rotation for an apparatus selected from an elevator, an escalator, or a movable track apparatus having a predetermined path for transporting cargo in alternating fashion between at least two fixed points, the roller assembly having a defined path of movement with respect to a second element, the second element having a shape and surface characteristic that are defined for engaging the roller assembly, the defined path of movement under at least one operative condition including a plurality of predetermined location points, comprising:

disposing a ring in solid form about the rim which is in faying contact with at least a portion of the rim and which includes forming the rolling surface with a first layer of first material having an operative characteristic related to surface behavior; and, disposing structure that is radially inwardly, as measured with respect to the axis of rotation, of at least a portion of the rolling surface in the uninstalled condition that has structural features disposed between the first rolling surface and the rim which include a first layer of a first material and further include a structural feature selected from the group consisting of at least one cavity, at least one material different from the material of the first layer, and both at least one cavity and at least one material different from the material of the first layer, which changes an operative characteristic relating to bulk behavior from the operative characteristic that the same rim assembly has except for being entirely filled radially inward of the rolling surface with the first material to the same external contour in the uninstalled condition.

24. The method for forming a rim assembly of claim 23 wherein the step of disposing structure includes forming a cavity disposed radially inwardly of the rolling surface of the ring between the rolling surface of the ring and the rim.

25. The method for forming a rim assembly of claim 23 wherein the step of disposing structure includes disposing a second material radially inwardly of the rolling surface of the first layer of material which is in faying contact with at least a portion of the first layer.

26. The method for forming a rim assembly of claim 25 wherein the step of disposing a second material includes disposing a second layer of material radially inwardly of the first layer.

27. The method for forming a rim assembly of claim 25 wherein the step of disposing a second material includes disposing discrete amounts of the second material within the first layer.

\* \* \* \* \*